United States Patent

Brinkman, Jr. et al.

[11] 3,898,587
[45] Aug. 5, 1975

[54] MULTIPLE-SOURCE PLASMA-OVERLAP LASER

[75] Inventors: William Frank Brinkman, Jr., Berkeley Heights; William Thomas Silfvast, Holmdel Twp., Monmouth County; Obert Reeves Wood, II, Holmdel, all of N.J.

[73] Assignee: Bell Telephone Laboratories, Incorporated, Murray Hill, N.J.

[22] Filed: Jan. 25, 1974

[21] Appl. No.: 436,494

[52] U.S. Cl......... 331/94.5 P; 331/94.5 G; 330/4.3; 176/1
[51] Int. Cl.......................... H01s 3/22; H01s 3/09
[58] Field of Search.......... 331/94.5; 330/4.3; 176/1

[56] References Cited
OTHER PUBLICATIONS

Howard, Jr., "Resonant Energy Transfer ... Gas Laser", A Gov't Research Report AD 603,680, August, 1964, pp. 22–31.
Dhez et al., J. of Applied Physics, Vol. 49, No. 6, May, 1969, QC 1 J7, pp. 2545–2548.
Jaegle et al., Physics Letters, Vol. 36a, No. 3, August 30, 1971, pp. 167–168, QC 75 A5.

*Primary Examiner*—Robert J. Webster
*Attorney, Agent, or Firm*—Wilford L. Wisner

[57] ABSTRACT

There are disclosed lasers employing lithium-indium ion mixtures or beryllium-gallium ion mixtures, in which the active medium is produced by overlap of two plasmas derived from optical or electron beam vaporization of material from two separated metallic sources extending parallel to the intended laser axis. Typically, a pulsed vaporization process produces ionized plasmas that can produce a Penning collision energy transfer in the plasma overlap region to produce the laser population inversion. Superradiant lasing action is the simplest mode of stimulated emission of the coherent radiation. A charge transfer system employing two species of atoms, either one or both being in an ionized state, also can produce the population inversion.

10 Claims, 4 Drawing Figures

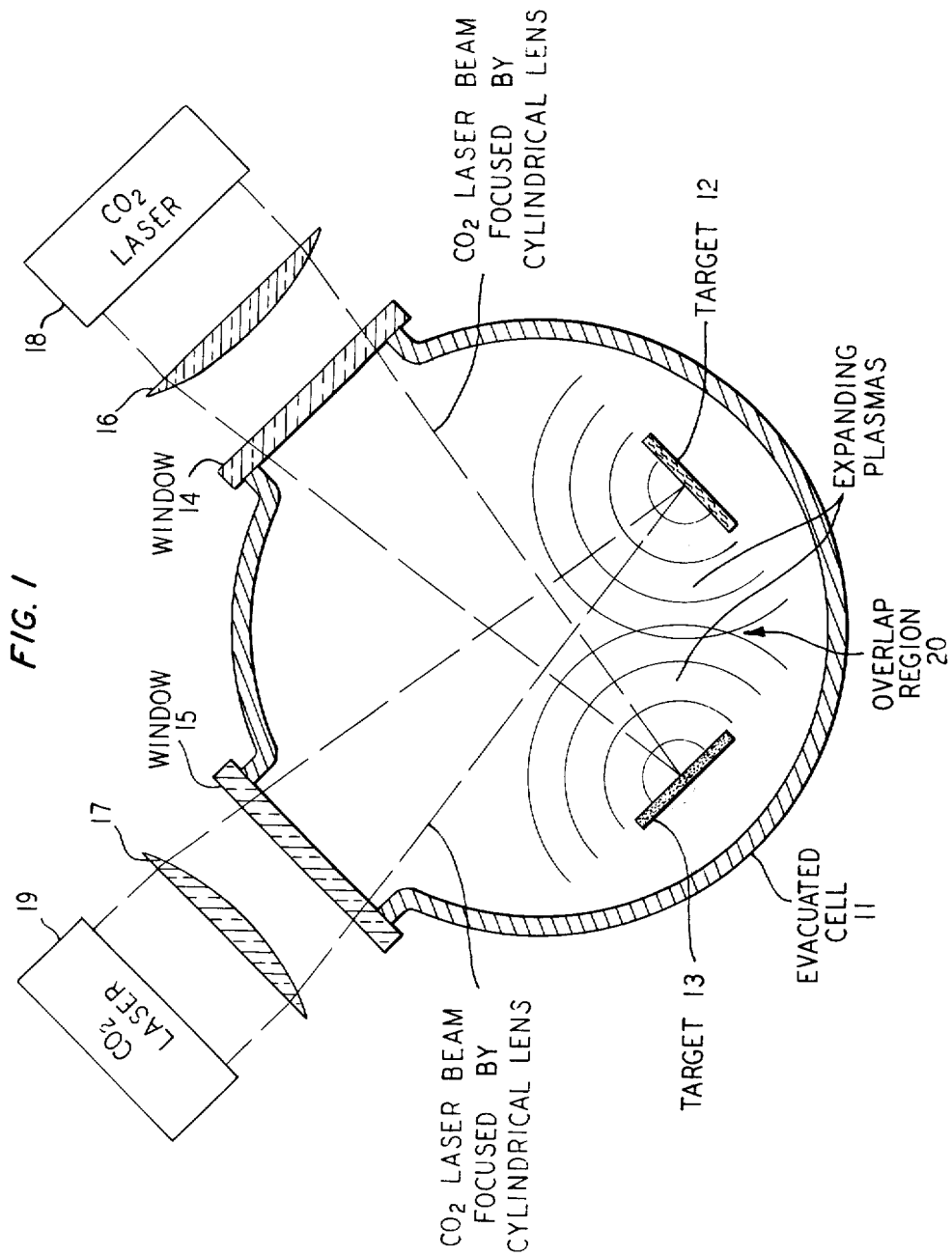

3,898,587

MULTIPLE-SOURCE PLASMA-OVERLAP LASER

BACKGROUND OF THE INVENTION

This invention relates to novel means for providing laser action in gaseous media, specifically in neutral and ionized metallic vapors.

One of the main largely unsatisfied objectives of the laser art is to obtain high-frequency optical ultraviolet or X-ray laser action in a manner which is not unduly limited with respect to fabrication feasibility and future development for commercial use. While a number of techniques have been suggested in the literature, some outstanding problems remain. An example is the blue or ultraviolet lasers proposed by D. L. Chubb et al. in *Applied Physics Letters*, Vol. 22, page 417 (Apr. 15, 1973) and by A. V. Vinogradov et al., *JETP Letters*, Vol. 16, page 447 (Dec. 20, 1972). The former reference suggests a charge transfer laser in which lasing action is produced in ionized calcium which is vaporized in an arc established in the energy-transferring gas, xenon. The second article discusses methods of extending similar energy transfer principles to still higher frequencies and points out the type of ionized species that might be used.

Nevertheless, the remaining problem not solved by either set of the foregoing authors is the problem of how to mix appropriate vaporized species to obtain a population inversion in species with the selected degree of ionization to emit the desired higher frequencies. The literature indicates limitations with the use of the arc vaporization technique.

SUMMARY OF THE INVENTION

According to our invention, the foregoing problem of appropriately mixing the vaporized species is solved by vaporizing them from two separated metallic or otherwise non-gaseous sources extending parallel to the intended laser axis and by stimulating the emission of coherent radiation from the region of plasma overlap. The stimulated emission may occur superradiantly if a sufficient length of the plasma overlap region exists. Successful population inversion should result in all cases in which one excited species, either in a metastable state of the atom or ion, or in the ground state of the ion, stores sufficient energy that it is capable of transferring to the other vaporized species in the plasma overlap region. Population inversion then occurs in the second vaporized species, which can be neutral or ionized to any selected degree.

Advantageously, the present invention can use either Penning collision energy transfer in the plasma overlap region or the use of charge transfer, sometimes called charge exchange, for energy transfer in the plasma overlap region. These phenomena have been identified in prior lasers, and are both generically described as phenomena involving collisions of the second kind. These phenomena are extended in novel ways by the techniques of the present invention.

BRIEF DESCRIPTION OF THE DRAWING

Further features and advantages of our invention will become apparent from the following detailed description, taken together with the drawing, in which:

FIG. 1 is a partially pictorial and partially block-diagrammatic cross-sectional view of a preferred embodiment of our invention.

DESCRIPTION OF ILLUSTRATIVE EMBODIMENTS

Figure 2A:
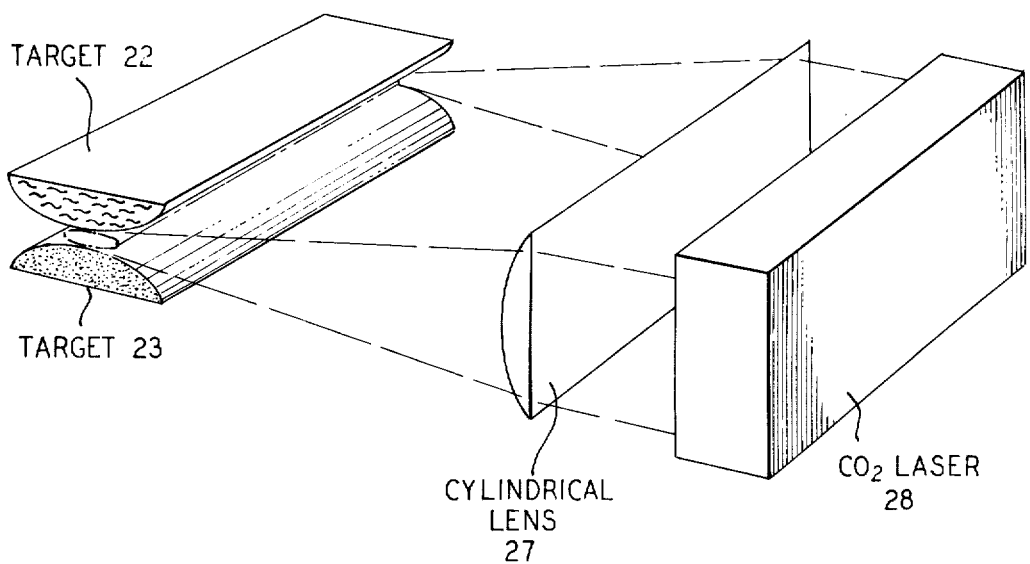
FIGS. 2A, 2B and 2C show modified embodiments of the invention in which a single vaporizing beam is used to vaporize the expanding plasmas from the separated sources, which typically may have a line of contact mid-way between the regions from which the plasmas are primarily generated.

In the illustrative preferred embodiment of FIG. 1, it is desired to generate a population inversion adequate for either superradiant or resonated lasing action from a plasma overlap region 20 within an evacuated cell 11 in response to pulsed beams from two separated coherent optical sources, e.g., $CO_2$ lasers 18 and 19. The evacuated cell 11 is longitudinally transparent to wavelengths about the intended laser wavelength and is transversely transparent to the 10.6 micrometer wavelengths of the pumping laser and contains a target 12, for example lithium, and a target 13, for example, indium, in the form of flat plates extending parallel to the axis of the intended plasma overlap region 20, which axis extends normal to the plane of the figure, e.g., along the line of sight. The beam from $CO_2$ laser 18 is collected by cylindrical lens 16 and focused in a flat ribbon-form through window 14 transparent at the pump frequency so as to converge in a narrow pumping line extending along target 13 parallel to the intended axis. Similarly, the beam from $CO_2$ laser 19 is collected by cylindrical lens 17 and focused in a ribbon-form through the window 15 to converge in a narrow line extending along the lithium target 12 in a line parallel to the intended axis of plasma overlap region 20. The wavelength (about 10 micrometers) of the laser radiation is considered advantageous for absorption by metal targets, but our invention is not limited thereto. Longer wavelengths may occasionally be desirable. The high degree of cylindrical focusing and high peak pulse power are likewise useful in facilitating said absorption and in generating plasmas that yield a useful overlap region.

Preparatory experiments not directed to the production of a population inversion have indicated that when an intense pulse of laser radiation is thus focused onto a solid target, part of the target material is vaporized; and expanding plasmas composed of the target vapor and heated electrons move out from the focal region at velocities up to about $10^6$ centimeters per second. Preliminary measurements using a transverse-excitation atmospheric pressure $CO_2$ laser have indicated that the expanding plasma from the solid target rises to a maximum density in about 50–100 nanoseconds (1 nanosecond $=10^{-9}$ seconds) and remains at or near the maximum for about 1 microsecond (1 microsecond $=10^{-6}$ seconds) when irradiated with a laser pulse of about 250 nanoseconds duration. This measurement implies that the leading edge of the plasma occupies a physical length in the direction of expansion of about 1 millimeter.

The foregoing measurements have been tried with a number of different metallic targets and have produced results independent of the target material, in the first order, for metallic-type targets.

Thus, in the embodiments of FIG. 1, when lasers 18 and 19 are pulsed simultaneously, both plasmas form above targets 12 and 13, respectively, and expand with semi-cyclindrical wavefronts as indicated diagramatically on the drawing and will first come into contact in the overlap region 20.

Lithium is chosen as the material for target 12 because it can store large amounts of energy in its ionized states and thus has the capability of playing a role as an energy-transferring gas. Indium is chosen for target 13 because it is a metal that in its first ionized state is capable of receiving stored energy from the ionized lithium by Penning collisions in analogy to the dominant process of energy exchange of the well-known helium-cadmium ion lasers. The upper laser state in that laser has a lifetime of about 0.7 microseconds (the $4d^95S^2\ ^2D$ state). This long lifetime is due to a relatively slow decay via a double electron transition to a lower p-state. In a continuous wave helium-cadmium discharge, the population density of this energy level is about $10^9$ per cubic centimeter and produces a gain of about 15% per meter.

Our calculations show that, in an embodiment such as FIG. 1, the $2s\ ^3S_1$ metastable energy level of ionized lithium ($Li^+$) will achieve densities between about $10^{12}$ per cubic centimeter and about $10^{16}$ per cubic centimeter in the expanding plasma. Under these conditions energies between about $10^{-3}$ joules per cubic centimeter and about $10^{-1}$ joules per cubic centimeter will be transferred to the indium from the excited state of the $Li^+$ ion, which is about 60 electron volts above the $Li^+$ ground state. In the expanding plasma, the $Li^+$ metastables are calculated to achieve rapidly a steady state density because the calculations show that an equilibrium or balance must be achieved at some point between the excitation and loss mechanism of the plasma. The expanding lithium plasma is confronted by an additional loss mechanism in the overlap region 20 via Penning collisions of the $Li^+$ metastables with the $In^+$ ions expanding in a similar wavefront from target 13. Many of the $In^+$ ions will be left in the $4d^95s^2\ ^2D$ state of $In^{++}$ (doubly-ionized indium). Based on analogy with the cadmium system, we assume a cross section of about $10^{-15}$ per cubic centimeter for the $Li^+$-$In^+$ system. The decay of the $Li^+$ metastable density M may be described as $$M = M_0 e^{-N \sigma_p v t} \qquad (1)$$

where N is the density of $In^+$ ground state atoms, $\sigma_p$ is the total Penning cross section for $Li^+$ ($^3S_1$) to all $In^{++}$ levels and v is the relative velocity. Assuming the values $v \cong 10^6$ cm/sec and $\sigma_p \cong 10^{+15}$ cm$^2$, in order for a large fraction of the metastable energy to be transferred in about $10^{-7}$ sec. (the estimated lifetime for the $^2D$ state), the density of $In^+$ of at least $10^{16}$ cm$^{-3}$ is required (corresponding to less than 1 Torr of vapor). For densities corresponding to Torr of vapor, the reaction would occur within a few nanoseconds and would cause ~10% of the $Li^+$ metastable atoms to transfer their energy to the $^2D$ level of $In^{++}$. The resulting optical gain would be about $10^2$ to $10^6$ times greater than in the 4416 A He-Cd continuous wave laser, or approximately $10^1$–$10^5$/meter and would result in stimulated emission of coherent radiation at 1850 A and 1532 A.

The gain of this system as projected above is sufficient for superradiant laser action even for a length of the overlap region parallel to targets 12 and 13 of no more than 1 centimeter. Somewhat less gain will provide an amplifier. Nevertheless, suitable mirrors reflective in the ultraviolet at 1850 A or 1532 A could be provided at opposite ends of the evacuated cell 11 normal to the intended axis of the overlap region 20, typically to form an internal resonator. Alternatively, if a resonator arrangement includes one or more Brewster-angle windows containing the vapor inside of respective external reflectors, they should be low-loss at the frequency of interest.

This excitation technique could also be applied to a $Be^{++}$-$Ga^{++}$ system since it is the next higher ionized system analogous to He-Cd. Furthermore, there are also many other possible systems using both the Penning reaction and the charge transfer reaction. An example of the latter system could be some of those given in the above cited article by A. V. Vinogradov et al.; two species of elements that can be similarly vaporized from non-gaseous states are preferred. It may turn out that ground state ion densities, of the type leading to charge transfer, are higher than metastable ion densities of the type leading to Penning ionization because of destructive collisions in the plasma. It is known that the ion densities are very high and can be regulated by choice of the initial laser intensities. Thus, the relative degree of ionization of the element from one target can be adjusted to obtain the desired metastable or ion population in the vapor. The energy-receiving plasma can be separately adjusted to obtain a matched condition for energy transfer. implementation of such fine control, and perhaps a charge transfer embodiment, awaits construction of the evacuated cell with pumping means suitable for maintaining relatively high vacuum therein with walls of cell 11 sufficient to withstand collapse under external air pressure. On the other hand, for some embodiments, it may be desirable to have a small background gas pressure. One specific modification of FIG. 1 contains such a gas pressure.

While it is not considered essential to have two separate laser sources 18 and 19 to practice the invention, it is considered that the normal penetration or overlap of two plasmas expanding from separated sources is highly desirable to the present invention. To appreciate this point, compare this plasma overlap with the situation in which two metals are mixed in an amalgam and then vaporized with a single laser. This will lead to a population inversion in one metal only if the ratios of the amounts of metals present in the amalgam are very precisely chosen. The disadvantage of such a crude technique is that the presence of metal B in the plasma detracts from the strength of the generation of a plasma of metal A, because metal B has a lower vaporization temperature and typically a much lower ionization potential than metal A, and tends to lower the electron temperature of the plasma of metal A as that plasma is generated. A much lower excitation rate to the highly excited states of metal A would result as compared to the excitation rate according to our invention with similar applied laser power. The lower excitation rate reduces the densities of the desired highly excited states of metal A. The obtaining of overall population inversion, and, thereafter, the achieving of gain needed for laser action, is then highly problematical. For example, the lower densities of the metastable states of A would then give a lower gain in metal B, if achieved by a transfer of energy to metal B.

Even though the technique of our invention involves a smaller amount of plasma in the overlap region the uncertainties of the amalgam method are avoided because the desired densities of both plasmas in the selected states of ionization can be separately selected and controlled.

Such selection and control is feasible even where only one vaporizing laser is used simply by using an "oversized" beam width of the laser beam with respect to the sum of the distances from the intended laser axis of the two separate essentially solid sources. For example, in FIG. 2A, target 12 is replaced by target 22 and target 13 by target 23. Targets 22 and 23 are of generally semi-cylindrical shape and are separated by small uniform gap through which the beam from $CO_2$ laser 28 is directed to vaporize the desired portions of materials from both targets with the desired electron temperatures. Opposite edges of the beam strike targets 22 and 23. The width of the narrow dimension of the ribbon beam determines the amounts of materials vaporized in total and the lateral displacement of the beam toward or away from one or the other target determines the relative amounts, e.g., the ratio of amounts of the materials vaporized.

Figure 2B:
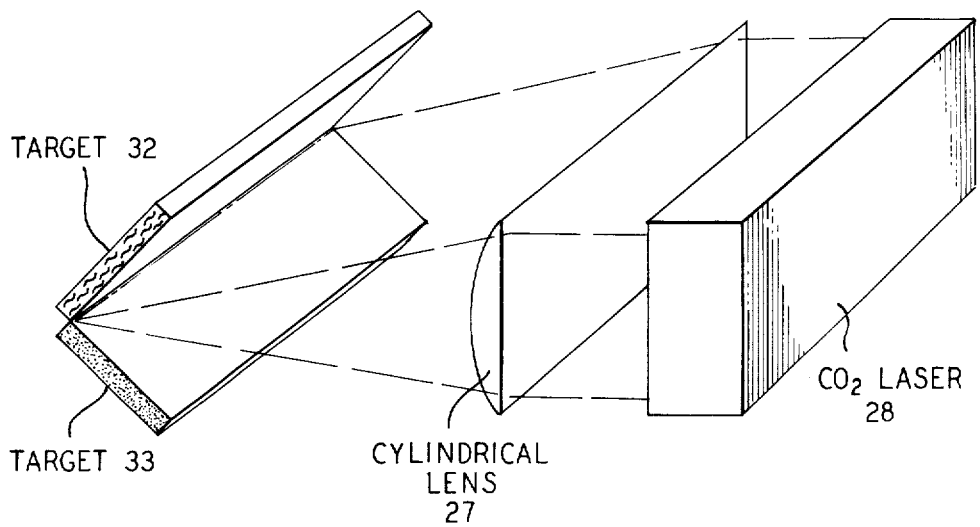
Figure 2C:
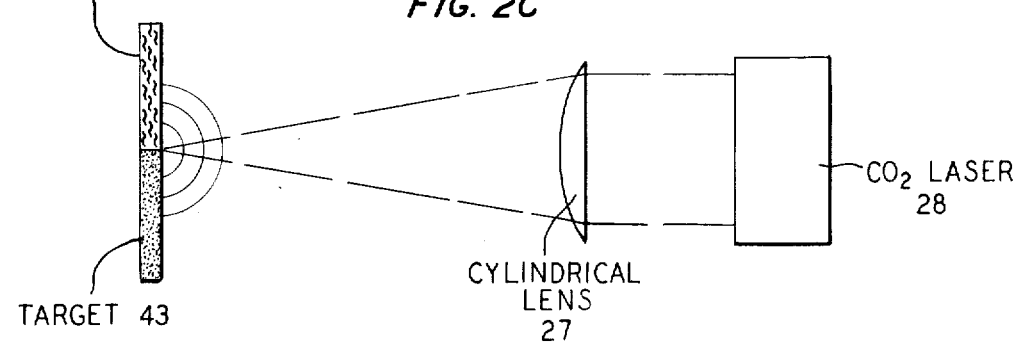

The same is true, even if the two targets are butted together along a line of contact as shown in FIGS. 2B and 2C. In FIG. 2B, a greater amount of overlap of the available plasmas may be achieved by butting them at a relative angle of 90 degrees which is bisected by the axis of the ribbon beam. A finer control of the relative amounts of ions of the two metals present in the plasmas in the overlap region may be provided by butting the two targets edge to edge as shown in FIG. 2C because the two plasmas propagate at a more acute angle with respect to one another, thus producing an effect similar to a greater amount of separation.

Although we have only mentioned helium-like ions as an energy source, there are many other possible metastable atoms and ions (A) that could store energy from the plasma and transfer it to the other vapor (B) in the overlap region.

The intensities of the two laser pulses, the relative positions of the focal regions and the possible time delay between the two pulses would allow a large variation of experimental conditions for each set of materials. Also, larger $CO_2$ laser beams could produce much longer plasmas in the breakdown region from which one would obtain more gain.

A $CO_2$ laser with a wide range of intensities and pulse widths would be essential to produce the various degrees of ionization of the target materials and to excite the levels in a time short compared to their lifetimes. A $CO_2$ oscillator-amplifier system is planned, where a $CO_2$ laser oscillator output is first passed through an optical gate capable of shuttering action to supply selected pulses as short as 1 or 2 nsec. The pulses are then fed through a $CO_2$ laser amplifier capable of amplifying the pulses to powers greater than $10^{10}$ watts.

A high energy electron beam could also be used to produce the plasmas and may even provide some preferable excitation conditions as compared to those anticipated in the optical breakdown plasma.

We claim:

1. A plasma generator comprising first and second bodies of material containing first and scond atomic species, respectively, said first and second bodies extending parallel to and being spaced from a particular axis, pulsed means for vaporizing material from said first and second bodies producing first and second plasmas, respectively, expanding in pulses in directions leading to overlap of said plasmas on said axis, said vaporizing means ionizing the first and second atomic species to selected degrees permitting one species to transfer energy to the ionized portion of the second species in the region of overlap, and means for utilizing selected properties of the plasma.

2. A plasma generator according to claim 1 in which the means for vaporizing plasmas from the first and second bodies comprise first and second pulsed lasers disposed to direct coherent radiation beams on said first and second bodies with radiation properties facilitating absorption of portions of said beams by said bodies.

3. A plasma generator according to claim 2 in which the means for vaporizing plasmas includes first and second means for cylindrically focussing the beams from said first and second lasers upon parallel ribbon-shaped regions of said first and second bodies, whereby the overlap of the plasmas from said bodies is elongated along a selected axis.

4. A plasma generator according to claim 1 in which the utilizing means includes means for supporting a vacuum about the first and second bodies while having at least one end transparent to a particular wavelength, the means for vaporizing material to produce plasmas from said first and second bodies comprising pulsed means for supplying said vaporizing electro-magnetic wave energy from outside said vacuum-supporting means from a direction substantially transverse to a selected axis, said vacuum-supporting means being adapted to admit said vaporizing beam and serving to remove vaporized material between pulses.

5. A plasma generator according to claim 4 in which the beam-supplying means comprises means for supplying first and second beams of electromagnetic wave energy to cross each other before impinging upon the first and second bodies respectively, said first and second bodies being oriented to receive said beams in directions substantially normal to their surfaces.

6. A plasma generator according to claim 4 in which the first and second bodies are separated from a selected axis by equal distances, and the beam-supplying means includes means for focusing said beam of electromagnetic wave energy to a waist between said bodies, said waist being elongated along said axis and having a narrow dimension transverse to said axis marginally greater than the sum of said distances.

7. A plasma generator according to claim 4 in which the first and second bodies are in contact along a line substantially parallel to a selected axis, and the beam supplying means includes means for focusing said beam upon said bodies throughout regions spanning said line of contact.

8. A plasma generator according to claim 7 in which the two bodies have a substantial area of contact and have essentially coplanar surfaces nearest the intended laser axis.

9. A plasma generator according to claim 1 in which the first body consists essentially of lithium and the second body consists essentially of indium.

10. A plasma generator according to claim 1 in which the first body consists essentially of beryllium and the second body consists essentially of gallium.

* * * * *